(12) United States Patent
Shin et al.

(10) Patent No.: US 8,044,937 B2
(45) Date of Patent: *Oct. 25, 2011

(54) TEXT INPUT METHOD AND MOBILE TERMINAL THEREFOR

(75) Inventors: Keun-Ho Shin, Suwon-si (KR); Kurgi Eduard, Suwon-si (KR); Sung-Wook Kang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 1019 days.

This patent is subject to a terminal disclaimer.

(21) Appl. No.: 11/875,326

(22) Filed: Oct. 19, 2007

(65) Prior Publication Data

US 2008/0096610 A1    Apr. 24, 2008

(30) Foreign Application Priority Data

Oct. 20, 2006 (KR) .................. 10-2006-0102593

(51) Int. Cl.
*G06F 3/02* (2006.01)
*G09G 5/00* (2006.01)

(52) U.S. Cl. ........................... 345/168; 345/173

(58) Field of Classification Search .......... 345/156–158, 345/168–169, 172–179; 341/22; 715/800, 715/801, 808, 815; 463/37–38; 178/18.01, 178/18.03, 18.05–18.07, 19.01–19.04
See application file for complete search history.

(56) References Cited

U.S. PATENT DOCUMENTS

| 5,956,021 | A | 9/1999 | Kubota et al. | |
|---|---|---|---|---|
| 6,169,538 | B1 * | 1/2001 | Nowlan et al. | 345/168 |
| 7,057,607 | B2 * | 6/2006 | Mayoraz et al. | 345/173 |
| 7,098,896 | B2 * | 8/2006 | Kushler et al. | 345/168 |
| 7,646,315 | B2 * | 1/2010 | Matteo et al. | 341/22 |
| 7,800,588 | B2 * | 9/2010 | Kim | 345/168 |
| 7,821,503 | B2 * | 10/2010 | Stephanick et al. | 345/173 |
| 2002/0030699 | A1 | 3/2002 | Van Ee | |
| 2005/0089226 | A1 * | 4/2005 | Chang et al. | 382/181 |
| 2005/0093826 | A1 * | 5/2005 | Huh | 345/168 |
| 2005/0099397 | A1 * | 5/2005 | Ono | 345/172 |
| 2005/0190147 | A1 * | 9/2005 | Kim | 345/156 |
| 2006/0059437 | A1 | 3/2006 | Conklin, III | |
| 2006/0097994 | A1 * | 5/2006 | Miyakoshi | 345/173 |
| 2006/0119582 | A1 * | 6/2006 | Ng et al. | 345/168 |
| 2006/0161846 | A1 * | 7/2006 | Van Leeuwen | 715/702 |
| 2007/0046641 | A1 * | 3/2007 | Lim | 345/173 |
| 2007/0229476 | A1 * | 10/2007 | Huh | 345/173 |
| 2007/0257896 | A1 | 11/2007 | Huh | |

FOREIGN PATENT DOCUMENTS

| CN | 1777858 | 5/2006 |
|---|---|---|
| JP | 09-081320 | 3/1997 |
| JP | 2002-062966 | 2/2002 |
| KR | 1020010013878 | 2/2001 |
| KR | 1020040057131 | 7/2004 |
| KR | 1020050040508 | 5/2005 |
| WO | WO 2004/079557 | 9/2004 |
| WO | WO 2006/020305 | 2/2006 |

\* cited by examiner

*Primary Examiner* — Ricardo L Osorio
(74) *Attorney, Agent, or Firm* — The Farrell Law Firm, P.C.

(57) ABSTRACT

A method for inputting text in a mobile terminal having a touch screen is provided. When detecting a touch-down, the mobile terminal displays a character of the touch-down point and nearby characters in an enlarged size and indicates the character of the touch-down point in the enlarged display. When a drag event occurs before a touch-up event, the mobile terminal determines the dragging distance and direction, changes the touch-down point to a new location according to the dragging distance and direction, and indicates another character at the new location. When a touch-up event occurs at the new location, the mobile terminal then inputs the other character indicated at the new location.

9 Claims, 4 Drawing Sheets

TEXT INPUT METHOD AND MOBILE TERMINAL THEREFOR

PRIORITY

This application claims priority under 35 U.S.C. §119(a) to a Korean Patent Application entitled "Text Input Method and Mobile Terminal Therefor" filed in the Korean Industrial Property Office on Oct. 20, 2006 and assigned Serial No. 2006-102593, the contents of which are hereby incorporated by reference.

BACKGROUND OF THE INVENTION

1. Field of the Invention

The present invention relates to a method for inputting text in a mobile terminal having a touch screen, and a mobile terminal for implementing the method.

2. Description of the Related Art

Generally, characters or numbers are input in a mobile terminal having a touch screen in a soft keypad input manner or a handwriting recognition manner. A soft keypad is an on-screen keypad generated on a touch screen, which enables a user to input data using a digital pen. Handwriting recognition software allows a user to provide input by writing on a touch screen. It recognizes the user's handwriting and converts the handwriting input into a data code. Mobile terminals, such as electronic schedulers, mobile phones and PDAs (Personal Digital Assistants), are generally provided with touch screens. Due to the trend toward small designs, touch screens provided on mobile terminals are also becoming smaller.

Since a soft keypad, including every key for inputting characters or numbers, is displayed in a relatively larger area of the touch screen, an actual area of displaying the input text is inevitably reduced. Also, every key of the soft keypad has a small size to be displayed on the small touch screen. Users may have some difficulty using the small-sized keys of the soft keypad accurately. They may often press a wrong key during the input of text.

SUMMARY OF THE INVENTION

Accordingly, the present invention has been made to solve the above-mentioned problems occurring in the prior art, and the present invention provides a method for inputting text in a mobile terminal having a touch screen and a mobile terminal for implementing the method.

In accordance with an aspect of the present invention, there is provided a mobile terminal, which includes a touch screen for displaying a soft keypad in a text input mode and generating a touch signal upon detecting a touch-down on the keypad; and a control unit for receiving the touch signal, controlling the touch screen to display a character of the touch-down point and nearby characters in an enlarged size and indicate the character of the touch-down point in the enlarged display, determining dragging distance and direction if a drag event occurs before a touch-up event, changing the touch-down point to a new location according to the dragging distance and direction, and indicating another character at the new location.

In accordance with another aspect of the present invention, there is provided a method for inputting text in a mobile terminal having a touch screen, which includes displaying a soft keypad on the touch screen and detecting a touch-down on the keypad in a text input mode; displaying a character of a touch-down point and nearby characters in an enlarged size and indicating the character of the touch-down point in the enlarged display; and determining dragging distance and direction if a drag event occurs before a touch-up event, changing the touch-down point to a new location according to the dragging distance and direction, and indicating another character at the new location.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the following description of the present invention, a detailed description of known functions and configurations incorporated herein will be omitted when it may make the subject matter of the present invention rather unclear.

The present invention provides a mobile terminal which enables a user to input characters in a text input mode by three consecutive events of touch-down/drag/up processed in software.

Figure 1:
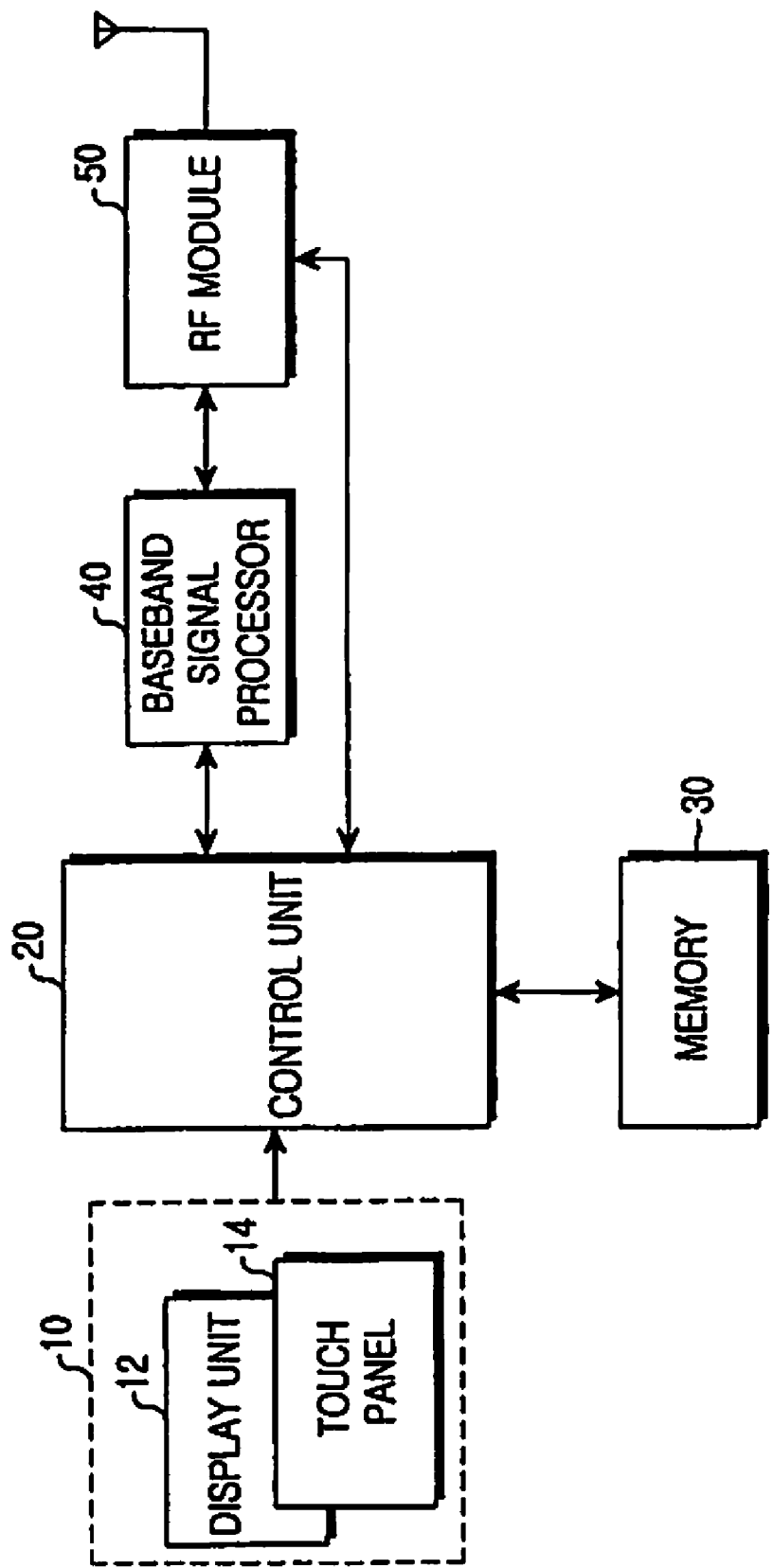
FIG. 1 is a block diagram of a mobile terminal according to a preferred embodiment of the present invention.

FIG. 1 is a block diagram of a mobile terminal according to a preferred embodiment of the present invention. The mobile terminal includes a touch screen 10, a control unit 20, a memory 30, a baseband signal processor 40 and an RF module 50.

The touch screen 10 is a user interface in the mobile terminal. In the text input mode, a soft keypad is displayed on the touch screen 10.

The touch screen 10 includes a display unit 12 and a touch panel 14 installed thereon. The display unit 12 displays status information, moving pictures or still pictures generated during the operation of the mobile terminal. The display unit 12 may include an LCD (Liquid Crystal Display), a TFT (Thin Film Transistor) or an organic EL (ElectroLuminescence). The touch panel 14 outputs a signal corresponding to the user's touch thereon to the control unit 20. The control unit 20 analyzes the signal received from the touch panel 14 and calculates location data of the point of touch.

The control unit 20 analyzes a touch signal outputted from the touch screen 10 and determines whether any of touch-down, drag and touch-up events has occurred. When a touch-down event occurs, the control unit 20 may indicate a character of the touch-down point on the display unit 12 of the touch screen 10. According to a preferred embodiment of the present invention, the control unit 10 enlarges the character of the touch-down point and nearby characters, and displays the enlarged characters on the display unit 12.

Since every key of the soft keypad has a small size to be displayed on the small touch screen, it is difficult to touch a desired key on the soft keypad accurately. To solve this problem, the control unit 10 enlarges both a character assigned to the key touched down by the user and near characters on screen in a predetermined area, and displays the enlarged characters on the display unit 12. At the same time, the control unit 10 may indicate the touched key or put a cursor on the touched key in order to indicate the recognized character.

Methods for indicating a character include a method indicating a character using a cursor, a method for highlighting a character, a method for placing a character within a box, etc.

If the indicated character is desired to be input, the user will have to lift his or her finger (i.e. touch-up) from the touch screen 10. If the indicated character is not the desired one, the user will have to drag the finger across the touch screen 10 in a direction toward the desired character while seeing the enlarged part of the keypad.

When such a drag event occurs, the control unit 20 determines the dragging distance and direction, and changes the touch point to a new location on the touch screen 10 according to the dragging distance and direction. Accordingly, a character corresponding to the new location is indicated on the touch screen 10. If the indicated character is desired to be input, the user will have to lift the finger from the touch screen 10. The control unit 20 will recognize that the character corresponding to the lift (or touch-up) point should be input. The control unit 20 will then display the recognized character in an input window on the display unit 14.

If the indicated character is not the desired one, the user will have to continue to drag the finger toward the desired character. The user can input the desired character by dragging to and touching up from a key corresponding to the desired character.

The RF module 50 sends and receives RF signals to and from a base station through an antenna to perform wireless communication with the base station. The RF module 50 converts a received RF signal into an IF (Intermediate Frequency) signal and outputs the IF signal to the baseband signal processor 40. Also, the RF module 50 converts an IF signal input from the baseband signal processor 40 into an RF signal and sends the RF signal. As a BAA (Baseband Analog ASIC (Application-Specific Integrated Circuit)) that provides an interface between the control unit 20 and the RF module 50, the baseband signal processor 40 converts a baseband digital signal applied from the control unit 20 into an analog IF signal and applies the analog IF signal to the RF module 50. The baseband signal processor 40 converts an analog IF signal applied from the RF module 50 into a baseband digital signal and applies the digital signal to the control unit 20.

The memory 30 connected to the control unit 20 is composed of a ROM (Read Only Memory) and a RAM (Random Access Memory) for storing a plurality of programs and data necessary to control the operations of the mobile terminal.

Figure 2:
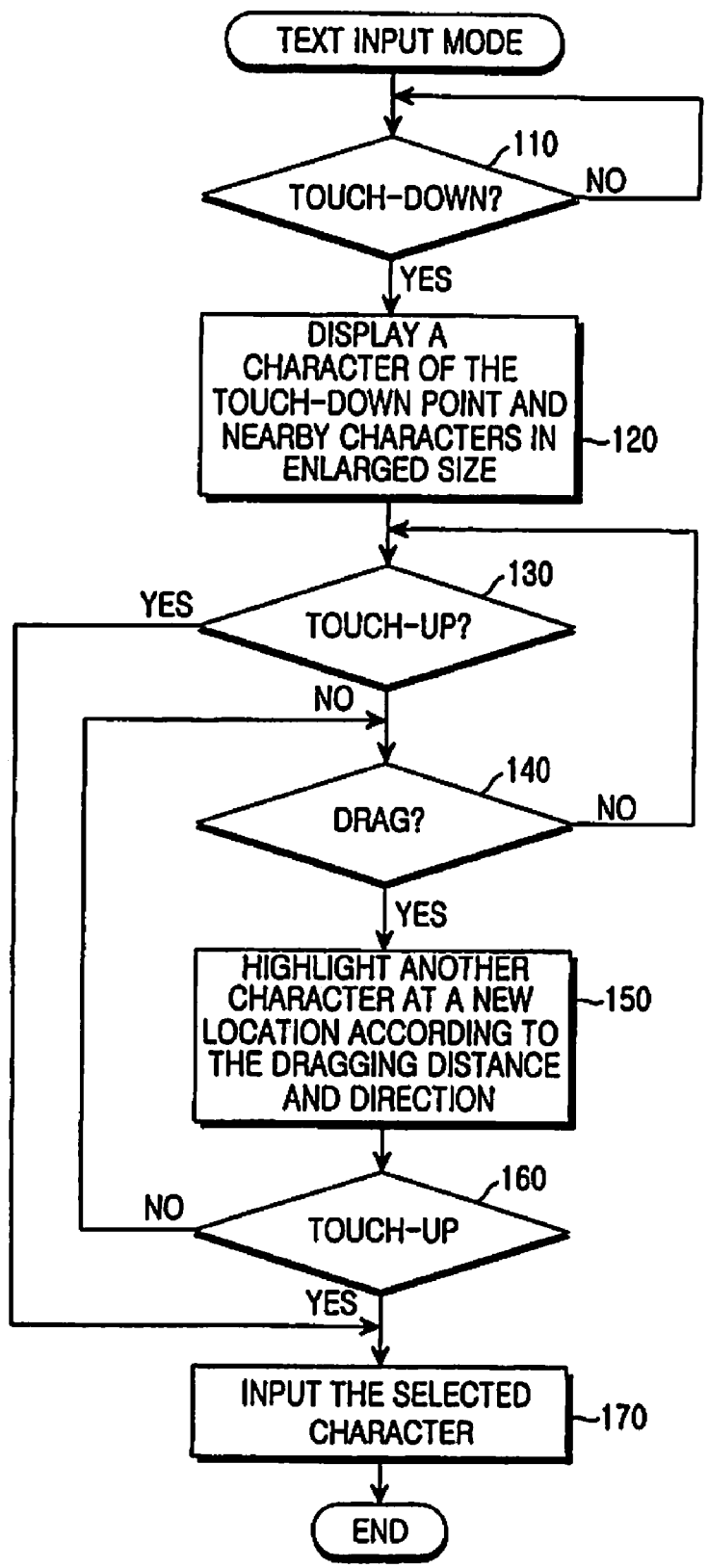
FIG. 2 is a flowchart showing a process of inputting characters in a mobile terminal according to a preferred embodiment of the present invention.

FIG. 2 is a flowchart showing a process of inputting characters in a mobile terminal according to a preferred embodiment of the present invention. FIGS. 3A to 3D illustrate a display screen in a text input mode according to a preferred embodiment of the present invention. FIGS. 4A to 4D illustrate a display screen in a text input mode according to another embodiment of the present invention.

Figure 3:
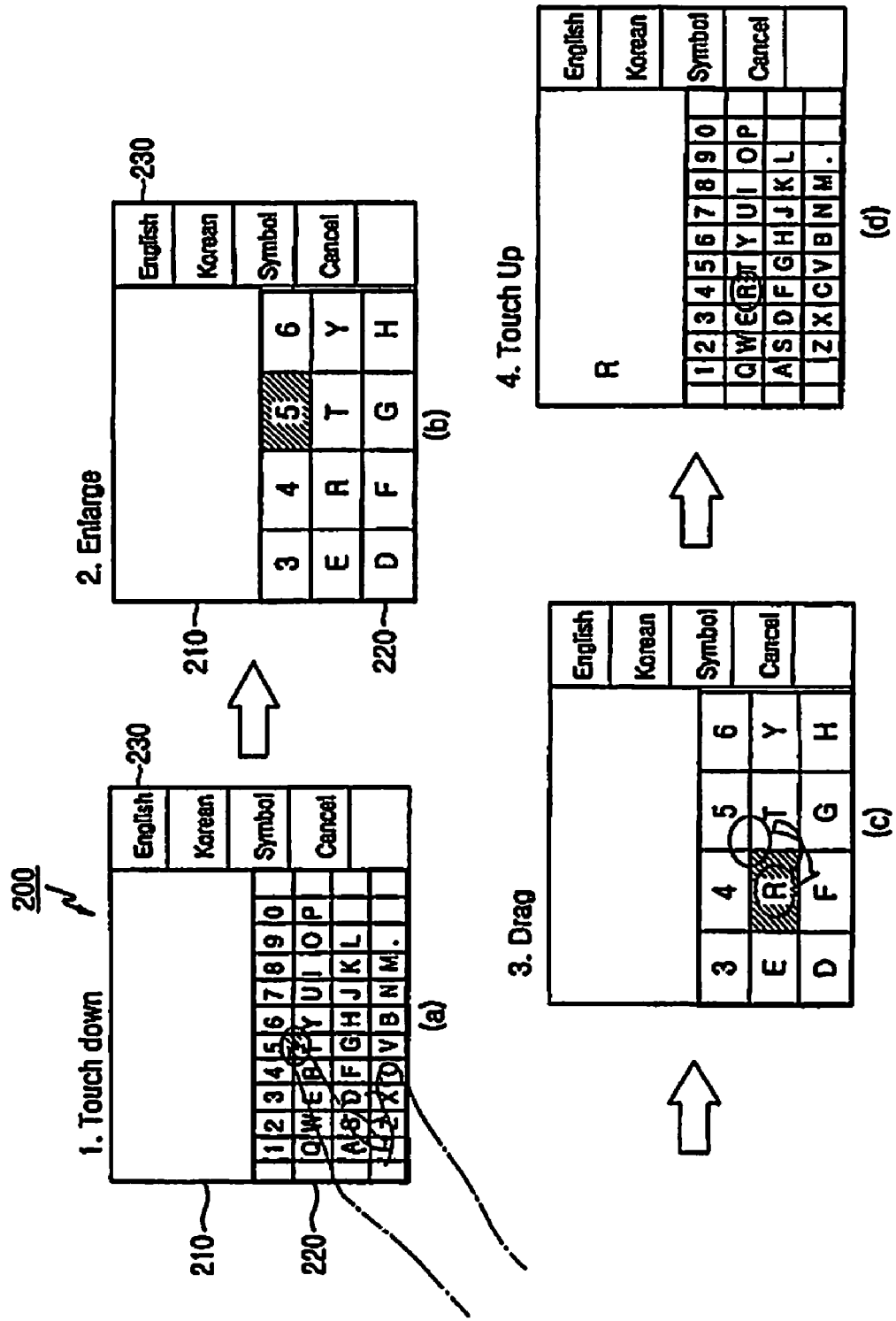
FIGS. 3A to 3D illustrate a display screen in a text input mode according to a preferred embodiment of the present invention.
Figure 4:
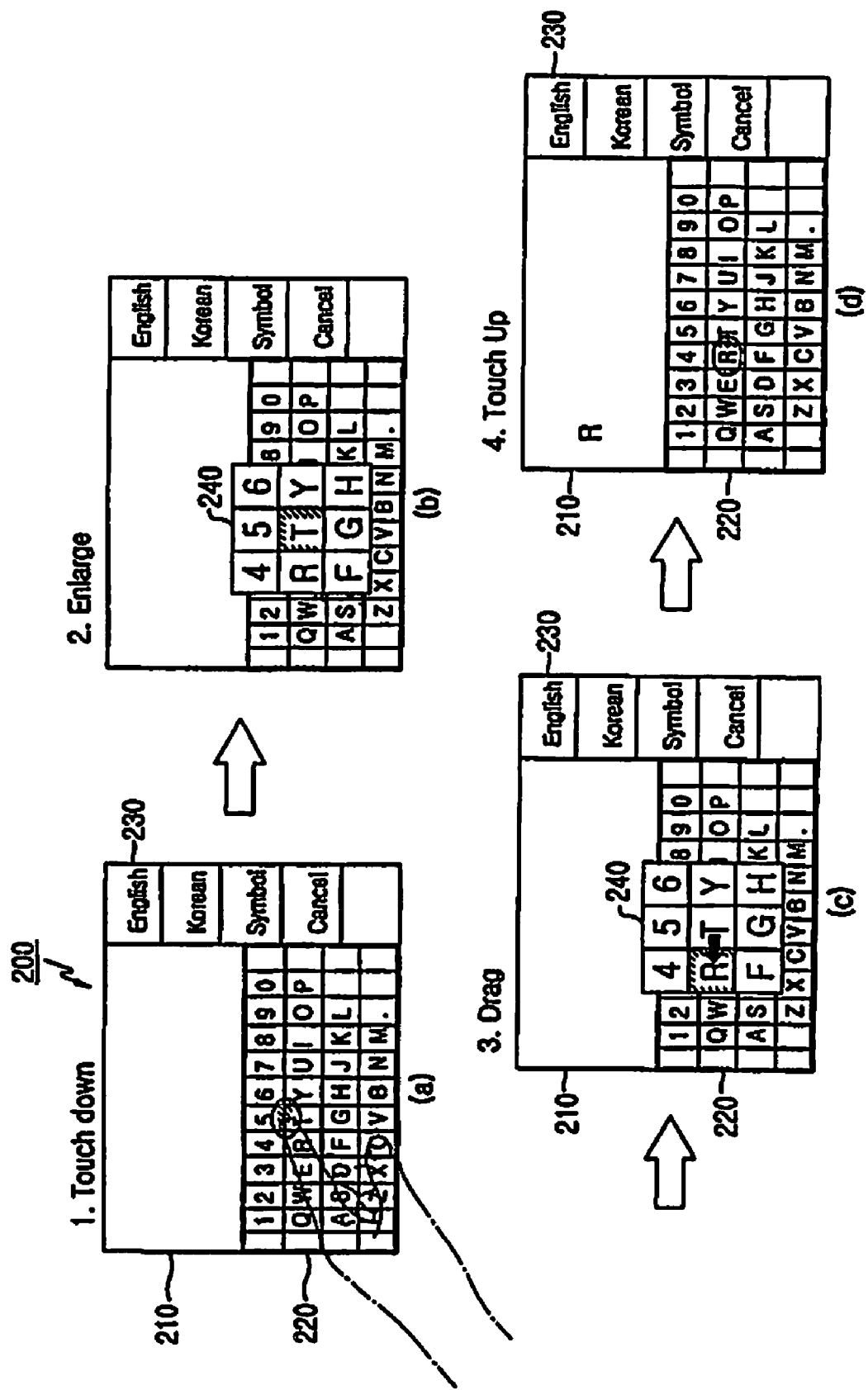
FIGS. 4A to 4D illustrate a display screen in a text input mode according to another embodiment of the present invention.

Referring to FIGS. 2 through 4, the control unit 20 displays a soft keypad on the touch screen 10 in the text input mode. Preferably, the soft keypad should have a QWERTY keyboard layout, which is currently the most popular keyboard layout. Of course, the soft keypad may have any other keyboard layout which enables any user to easily search for a desired character. Referring to FIGS. 3 and 4, the touch screen 200 includes an input window 210, a soft keypad display area 220 and an option display area 230. Options can be selected to input English characters, Korean characters or symbols. The user may touch the soft keypad display area 220 to input a desired character. The control unit 20 recognizes the character corresponding to the touched key and displays the character in the input window 210.

While the soft keypad is displayed on the touch screen 10 in the text input mode, the control unit 20 determines whether a touch-down event occurs on the touch screen 10 in step 110.

The user can touch a key, which is assigned a desired character, with a finger. Since the keys of the soft keypad are small, the user's finger is likely to touch one or more keys other than the desired key.

When such a touch-down event occurs, the control unit 20 proceeds to step 120 in order to enlarge the character of the touch-down point (i.e. the character on the touched key) and characters on nearby keys and to display the enlarged characters on the display unit 12 of the touch screen 10. At the same time, the control unit 20 may indicate the touched key or put a cursor on the touched key in order to indicate the character assigned to the key.

Referring to FIGS. 3A and 3B, when the user's finger touches an area over the edges of keys assigned 4, 5, 6, R, T and Y on the soft keypad, the control unit 20 enlarges the touched keys and nearby keys, and displays those keys in the full soft keypad display area 220. At the same time, the control unit 20 puts a indicated cursor on the "5" key, on which a greater portion of the finger touches down.

Alternatively, when the user's finger touches an area over the edges of keys assigned 4, 5, 6, R, T and Y on the soft keypad, the control unit 20 may generate a popup window on the display unit 12 and display the touched keys and nearby keys in an enlarged size in the popup window as illustrated in FIGS. 4A and 4B. At the same time, the control unit 20 indicates a key on which a greater portion of the finger touches down.

If the character or number on the indicated key is desired to be input, the user will have to touch-up from the touch screen 10. The control unit 20 checks whether the touch-up event occurs in step 130.

If the character or number on the indicated key is not the desired one, the user will have to drag the finger toward the desired character or number, while seeing the enlarged part of the soft keypad. In other words, if a touch-up event does not occur, the control unit 20 will proceed to step 140 in order to check whether a drag event occurs. Upon detecting a drag event, the control unit 20 proceeds to step 150 in order to determine the dragging distance and direction and change the indicated point to a new location on the touch screen 10 according to the dragging distance and direction. More specifically, the control unit 20 calculates the dragging distance and direction from the currently indicated key. The user can select a desired character with the dragging motion, while seeing the enlarged part of the soft keypad or the popup window generated on the touch screen 10.

FIGS. 3C and 4C show that the "R" key is newly selected and indicated with a finger drag. As illustrated in FIG. 3C, the user can select the "R" key by dragging the finger in a southwest direction from the previously selected "5" key. If the "T" key was previously selected by a touch-down, the user can select the "R" key by dragging the finger in a left direction as illustrated in FIG. 4C.

If the character on the newly indicated key is desired to be input, the user will have to touch-up from the touch screen 10. The control unit 10 checks whether such a touch-up event occurs in step 160. If a touch-up event does not occur, the control unit 20 will repeat step 140. In other words, if the character on the newly indicated key is not the desired one, the user will continue to drag over the touch screen 10 to select the desired character.

If the character on the newly indicated key is the desired one, the user will touch-up from the touch screen 10. Then, the control unit 20 proceeds to step 170 in order to input the same character. As illustrated in FIGS. 3D and 4D, the input character is displayed in the input window 200. At the same time, the entire soft keypad is displayed again on the display unit 12 of the touch screen 10.

The user will not have to be extremely accurate when touching. Even if the user's finger touches the edges of a desired character or nearby characters, the user can easily select the desired character by subsequent drag and touch-up motions.

As explained above, the text input method according to the present invention enables a user to easily select and input a desired character in a mobile terminal having a touch screen. The method is applicable to all mobile phones or handheld computers having a small-sized touch screen to facilitate the user interface.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A mobile terminal including:
    a touch screen for displaying a soft keypad in a text input mode and generating a touch signal upon detecting a touch-down on the keypad; and
    a control unit for receiving the touch signal, controlling the touch screen to display a character of a touch-down point and nearby characters in an enlarged size and indicate the character of the touch-down point in an area of the display containing the character of the touch-down point and nearby characters in an enlarged size, checking whether a drag event occurs, determining a dragging distance and a direction if the drag event occurs before a touch-up event, changing the touch-down point to a new location according to the dragging distance and direction, and indicating another character at the new location.

2. The mobile terminal according to claim 1, wherein said control unit inputs the other character when a touch-up event occurs at the new location.

3. The mobile terminal according to claim 1, wherein said soft keypad is a QWERTY keypad.

4. The mobile terminal according to claim 1, wherein said control unit displays the character of the touch-down point and nearby characters in an enlarged size in the full area of the soft keypad.

5. The mobile terminal according to claim 1, wherein said control unit generates a popup window and displays the character of the touch-down point and nearby characters in an enlarged size in the generated popup window.

6. A method for inputting text in a mobile terminal having a touch screen, which comprises the steps of:
    displaying a soft keypad on the touch screen and detecting a touch-down on the keypad in a text input mode;
    displaying a character of a touch-down point and nearby characters in an enlarged size and indicating the character of the touch-down point in the an area of the display containing the character of the touch-down point and nearby characters in an enlarged size; and
    checking whether a drag event occurs, determining dragging distance and direction if the drag event occurs before a touch-up event, changing the touch-down point to a new location according to the dragging distance and direction, and indicating another character at the new location.

7. The method according to claim 6, further comprising the step of inputting the other character when a touch-up event occurs at the new location.

8. The method according to claim 6, wherein said soft keypad is a QWERTY keypad.

9. The method according to claim 6, wherein the character of the touch-down point and nearby characters are displayed in an enlarged size in the full area of the soft keypad.

* * * * *